(12) United States Patent
Liss et al.

(10) Patent No.: US 10,694,849 B2
(45) Date of Patent: Jun. 30, 2020

(54) POST COUPLERS

(71) Applicant: Edsal Manufacturing Company, Inc., Chicago, IL (US)

(72) Inventors: Mitchell Liss, Northbrook, IL (US); Anthony J. Troyner, Shorewood, IL (US); Jeff Lamber, Minooka, IL (US)

(73) Assignee: Edsal Manufacturing Company, Inc., Chicago, IL (US)

( * ) Notice: Subject to any disclaimer, the term of this patent is extended or adjusted under 35 U.S.C. 154(b) by 193 days.

(21) Appl. No.: 15/684,284

(22) Filed: Aug. 23, 2017

(65) Prior Publication Data

US 2019/0059588 A1 Feb. 28, 2019

(51) Int. Cl.
| | | |
|---|---|---|
| A47B 96/14 | (2006.01) | |
| A47B 47/02 | (2006.01) | |
| F16B 12/32 | (2006.01) | |
| F16B 12/34 | (2006.01) | |
| A47B 87/02 | (2006.01) | |

(52) U.S. Cl.
CPC ........ *A47B 96/1475* (2013.01); *A47B 47/021* (2013.01); *A47B 96/1408* (2013.01); *A47B 96/1441* (2013.01); *F16B 12/32* (2013.01); *A47B 87/0215* (2013.01); *F16B 12/34* (2013.01)

(58) Field of Classification Search
CPC ... Y10T 403/42; Y10T 403/73; Y10T 403/50; Y10T 403/55; Y10T 403/551; Y10T 403/555; Y10T 403/4602; A47B 87/0246; A47B 87/0207; A47B 87/0215; A47B 96/145; A47B 96/1458; A47B 57/50
See application file for complete search history.

(56) References Cited

U.S. PATENT DOCUMENTS

| | | | |
|---|---|---|---|
| 1,458,666 A | 6/1923 | Stoppello | |
| 2,226,763 A | 12/1940 | Geib et al. | |
| 2,296,336 A | 9/1942 | Crozier | |
| 2,367,206 A | 1/1945 | Davis | |
| 2,939,589 A * | 6/1960 | Bellon | A47B 57/18 |
| | | | 108/147.15 |
| 3,056,507 A | 10/1962 | Squires, Jr. et al. | |
| RE27,200 E | 10/1971 | Ferdinand et al. | |
| 3,788,001 A | 1/1974 | Balfanz, Jr. | |

(Continued)

FOREIGN PATENT DOCUMENTS

| | | |
|---|---|---|
| DE | 29808396 U1 | 8/1998 |
| EP | 0063805 A2 * | 11/1982 |
| EP | 0981979 A1 * | 3/2000 |

OTHER PUBLICATIONS

International Search Report for PCT Application S/N PCT/US2005/002581, completed on May 25, 2005, dated Jun. 2, 2005.

(Continued)

*Primary Examiner* — Jonathan P Masinick
(74) *Attorney, Agent, or Firm* — Wood Herron & Evans LLP

(57) ABSTRACT

A post coupler has one or more positive post stops therein limiting extension of an end of a post section in or over the coupler beyond the stop. The stops may be freely extended tabs or stop embossments from or in the coupler flanges. Outside wrap, inside wrap and hidden post couplers are disclosed, as well as assembly methods.

13 Claims, 9 Drawing Sheets

(56) References Cited

U.S. PATENT DOCUMENTS

| | | | |
|---|---|---|---|
| 4,167,353 A * | 9/1979 | Gebhardt | F16B 12/50 |
| | | | 220/684 |
| 4,598,512 A | 7/1986 | Chapman | |
| 4,967,916 A | 11/1990 | Handler et al. | |
| 5,395,093 A | 3/1995 | Chrisman | |
| 5,423,576 A | 6/1995 | Hunter | |
| 5,425,520 A * | 6/1995 | Masumoto | A47B 96/06 |
| | | | 248/247 |
| 5,463,966 A * | 11/1995 | Nilsson | A47B 57/50 |
| | | | 108/110 |
| 5,971,175 A | 10/1999 | Bustos | |
| 6,209,155 B1 | 4/2001 | Epstein et al. | |
| 6,397,413 B2 | 6/2002 | Epstein et al. | |
| 6,681,705 B2 | 1/2004 | Wetterberg | |
| 6,839,920 B2 | 1/2005 | Schulte | |
| 7,497,054 B2 * | 3/2009 | Takeuchi | E04B 1/2403 |
| | | | 403/403 |
| D690,189 S | 9/2013 | Wojtowicz et al. | |
| D690,582 S | 10/2013 | Wojtowicz et al. | |
| D693,668 S | 11/2013 | Wojtowicz et al. | |
| 8,585,313 B2 | 11/2013 | Wojotowicz et al. | |
| 8,632,272 B2 | 1/2014 | Wojtowicz et al. | |
| 8,672,577 B2 | 3/2014 | Wojtowicz et al. | |
| 8,714,864 B2 | 5/2014 | Wojtowicz et al. | |
| D708,051 S | 7/2014 | Wojtowicz et al. | |
| 9,439,508 B2 | 9/2016 | Wojtowicz et al. | |
| 2002/0171338 A1 | 11/2002 | Wetterberg | |

OTHER PUBLICATIONS

Written Opinion of International Searching Authority for PCT Application Serial No. PCT/US2005/002581, dated Jun. 2, 2005.

* cited by examiner

POST COUPLERS

FIELD OF THE INVENTION

This invention relates to post couplers used to couple together, end-to-end, posts of the type used, for example, in shelving constructions and more particularly to improvements in such couplers.

BACKGROUND OF THE INVENTION

Post couplers are used to couple together posts or columns used in shelving units. For example, shelving units are typically supplied to the consumer in packages of component pieces; the consumer tasked with assembling the components into a finished shelving unit. Many shelving units in finished condition are tall, such as six feet or more. In order to consolidate the package for component pieces as supplied to a consumer, the posts or columns are shipped in smaller lengths. Two or more posts are then coupled end-to-end to form the finished height unitary corner posts for the finished unit.

Typically the corner post components are of suitable materials, such as steel, in formed, angular configurations having two major flanges joined at 90° along the post component length. For joining these angular components end-to-end, a variety of post couplers are provided.

In one form of coupler, known as an outside wrap coupler, the coupler comprises two coupler flanges each with a reverse bend flange extending therefrom and wrapping around the edges of the post flanges from the backside or outside of the post components.

In another form coupler, known as an inside wrap coupler, the coupler comprises two coupler flanges each with a reverse bend flange extending therefrom and wrapping around the edges of the post flanges from the front side or inside of the post components.

In use, respective ends of the posts to be coupled are disposed in the coupler used, with the post components extending longitudinally therefrom and the reverse bend flanges forming, with the coupler flanges, a gap. This gap receives respective post flanges in the coupler securing the posts end-to-end.

In another form of coupler, known as a hidden coupler, the posts include not only adjoined post flanges joined at an angle but respective parallel reverse bend flanges each forming a gap with a respective post flange. The hidden coupler comprises coupler flanges formed at the angle, but has no reverse bend flanges. In use, the angular hidden coupler extends into the respective gaps formed by the post flanges and the reverse bend flanges to join the posts end-to-end.

In all these cases, the couplers are relatively short, compared to the length of the post components, but long enough to join and hold the post components end-to-end to form a composite, unitary post for use as a post or corner column in a shelving unit. From there, respective shelf supporting beams are assembled to the respective joined, composite, corner posts and shelves are placed on the beams to complete the shelving unit.

Such prior post couplings as noted above are described in the following, issued, U.S. patents which are expressly incorporated herein by this express reference: U.S. Pat. Nos. 8,585,313; 8,632,272; 8,672,577; 8,714,864; 6,681,705; 6,209,155; D690,189; D690,582; D693,688 and D708,051.

Certain post couplers described in these patents have dimples, extending inwardly from near the ends of the reverse bend flanges of the couplers, and enhance frictional fit of the post ends between the coupler flanges and the coupler's reverse bend flanges. In several constructions, an additional small, rounded, dimple is disposed centrally in the reverse bend flanges between the noted dimples and near the area where the post ends will reside.

The inside wrap and outside wrap couplers are typically manufactured in a process where the coupler flanges are formed at about 90° by bending, and the reverse bend flanges are bent at about 180° to lie generally parallel to and alongside the respective coupler flange, with the gap therebetween only slightly wider than the post flange anticipated to be received therebetween.

For security of the coupling, the post flanges should be held frictionally within this gap. However, manufacturing techniques may not be so exacting in large volume manufacturing that the coupler gaps are repeatedly and consistently the same to specification. As a result, the fit of the post component ends within the coupler may not be wholly consistent and secure. For example, one post end may extend further into the coupler, past its central area, leaving only a short coupler length along the other post and thus resulting in an insecure or flimsy coupling and unitary corner post for the shelving unit.

Similar inconsistencies and results are present in the hidden coupler, where post components are formed by bending with inconsistent gaps between the post flanges and post reverse bend flanges permitting one post end to extend too far along the hidden coupler. This leaves too little coupler extension along the end of the other post, resulting in a wobbly or insecure unitary post.

It is thus one objective of the invention to provide improved post couplers enhancing the coupling between two post components.

Another objective of the invention is to provide improved post couplers where insertion of each post to be coupled is limited.

Another objective of the invention is to provide a post coupler insuring equal coupling lengths along each end of joined posts.

SUMMARY OF THE INVENTION

To these ends and in accordance with the invention, preferred embodiments of the invention include improved post couplers provided with a positive post extension stop provided in coupler flanges of a post coupler. One such stop includes tabs formed from respective post coupler flanges and with free tab ends extending from the respective post coupler flanges into the path of any post end inserted into the coupler. An alternative embodiment includes a post stop defined by an elongated monolithic projection extending within and from the flanges of a post coupler, and laterally, all to prevent extension of a post end there beyond.

As a result, uniformity of coupling function is assured, securely receiving and holding post components end-to-end without extension of any post end beyond the extension of any other post end in or over the coupling.

BRIEF DESCRIPTION OF THE DRAWINGS

These and other objectives and advantages will be appreciated from the following written description and from the drawings in which.

DETAILED DESCRIPTION OF THE INVENTION

Figure 1:
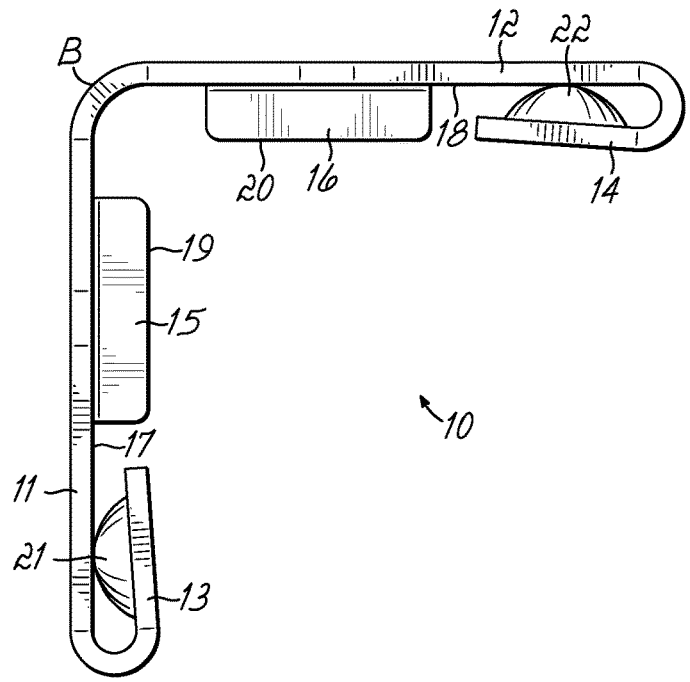
FIG. 1 is a top plan view of one embodiment of a post coupler according to the invention, and referred to as an outside wrap post coupler.
Figure 2:
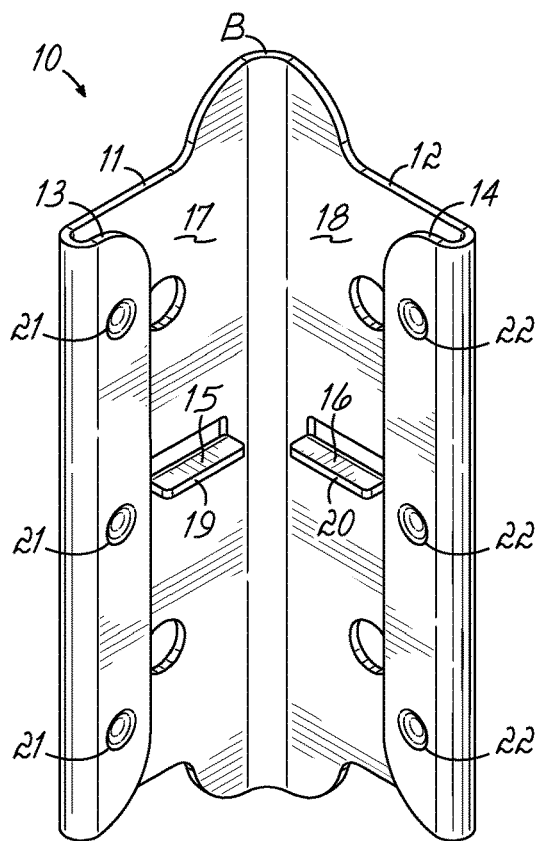
FIG. 2 is an isometric view of the post coupler of FIG. 1.
Figure 3:
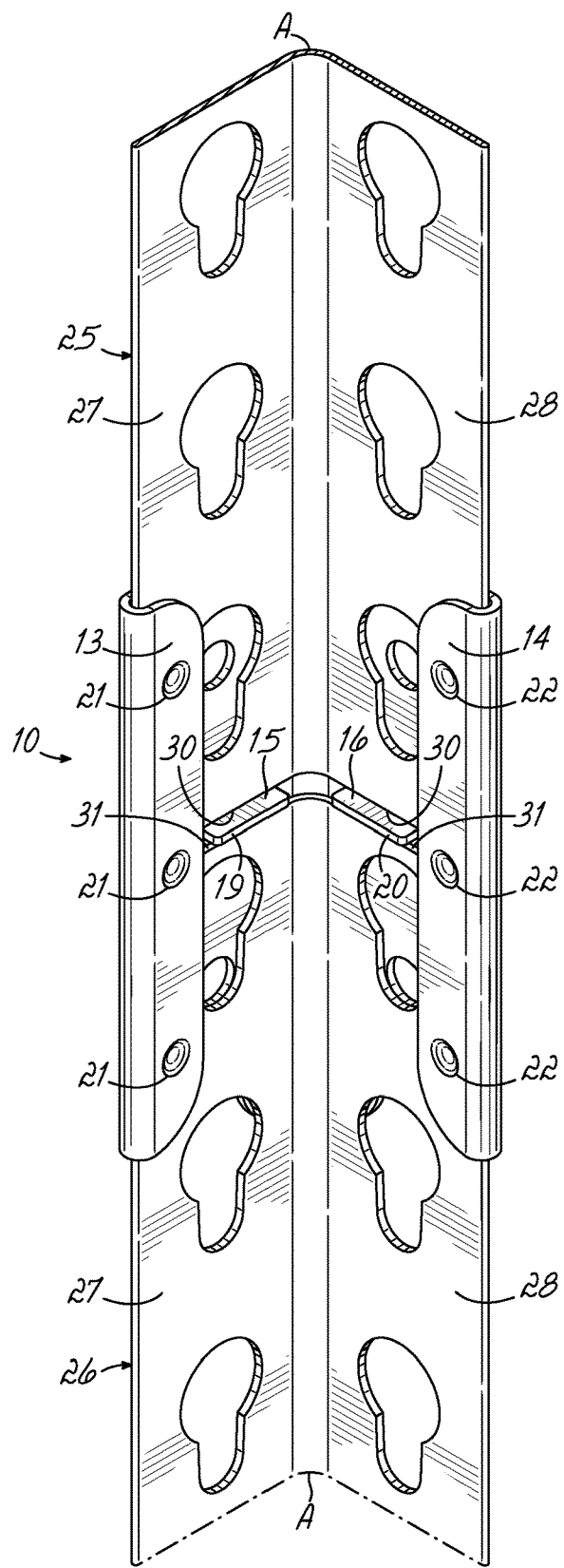
FIG. 3 is an isometric view of the post coupler of FIGS. 1 and 2 in operative position coupling two posts together.
Figure 4:
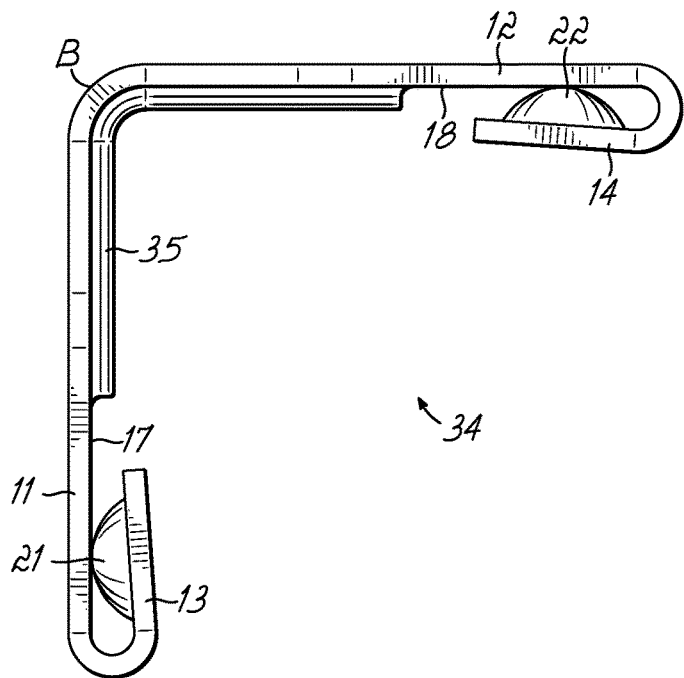
FIG. 4 is a top plan view of a second embodiment of a post coupler according to the invention, and also referred to as an outside wrap post coupler.
Figure 5:
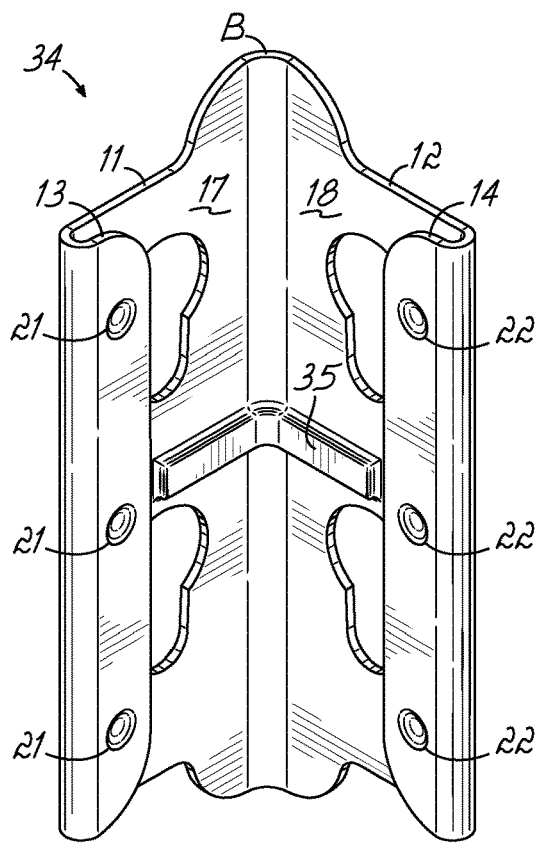
FIG. 5 is an isometric view of the post coupler of FIG. 4.
Figure 6:
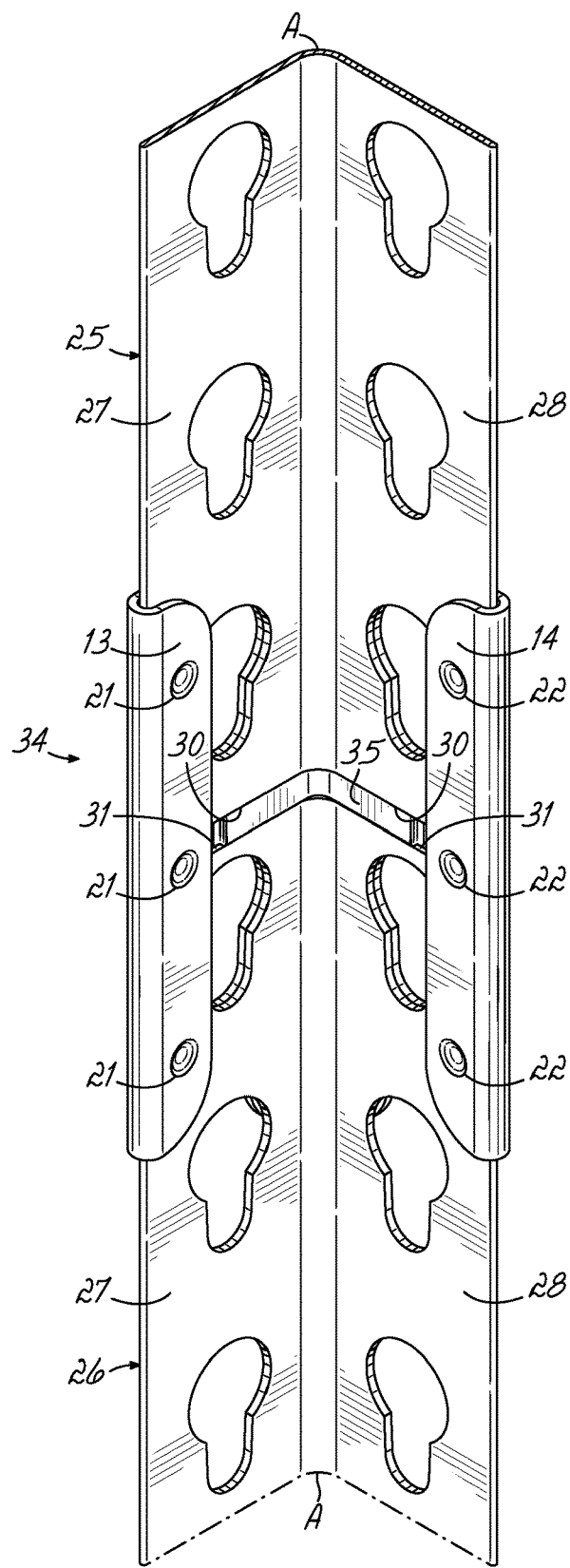
FIG. 6 is an isometric view of the post coupler of FIGS. 4 and 5 in operative position coupling two posts together.
Figure 7:
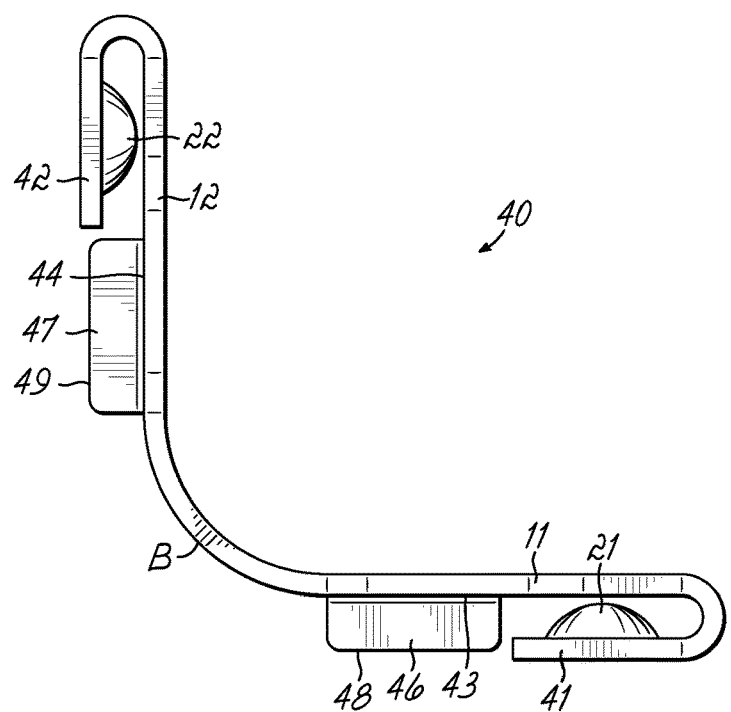
FIG. 7 is a top plan view of a third embodiment of a post coupler according to the invention and referred to as an inside wrap post coupler.
Figure 8:
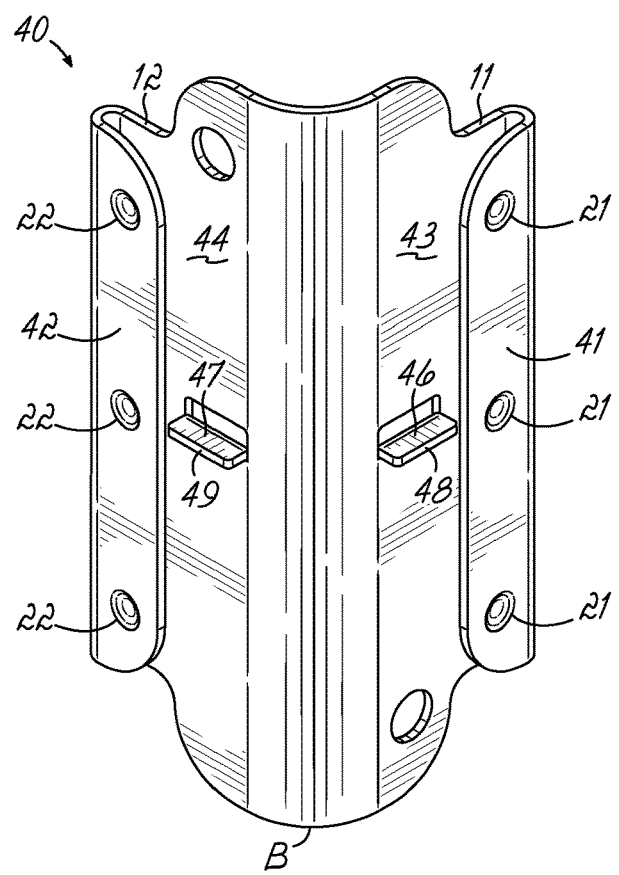
FIG. 8 is an isometric view of the post coupler of FIG. 7.
Figure 9:
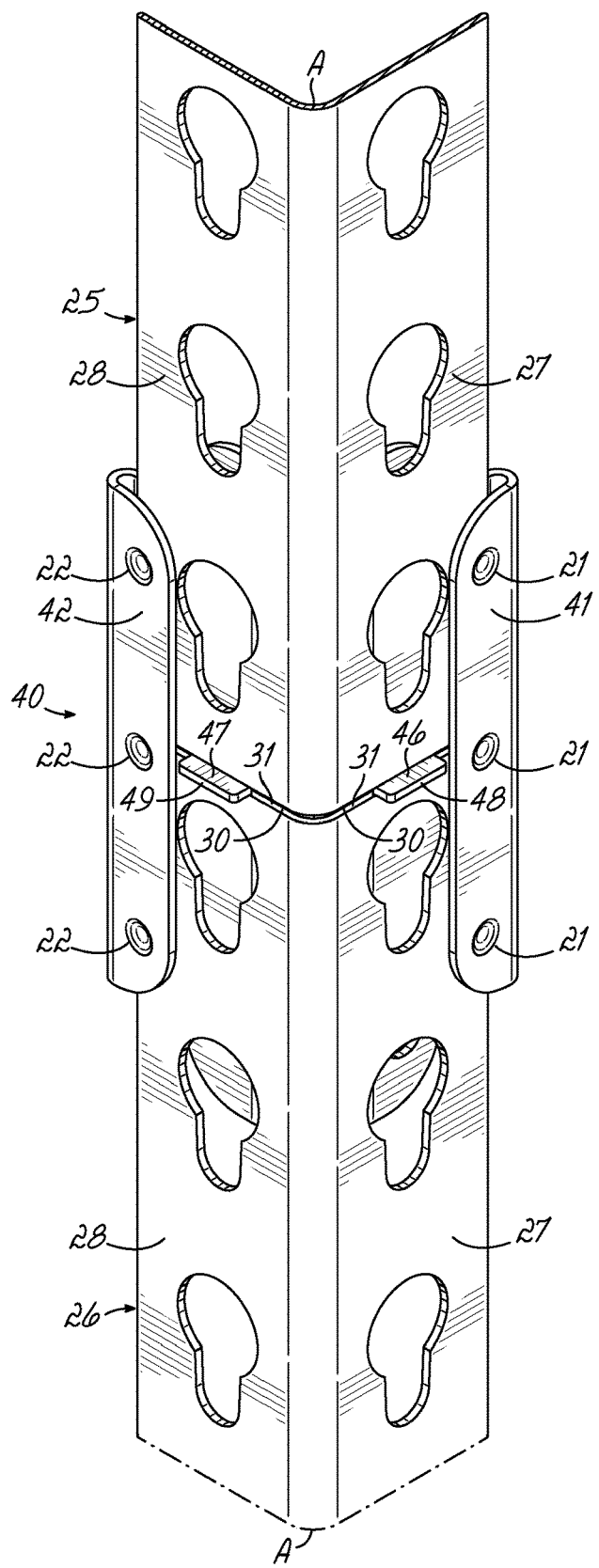
FIG. 9 is an isometric view of the post coupler of FIGS. 7 and 8 in operative position coupling two posts together.
Figure 10:
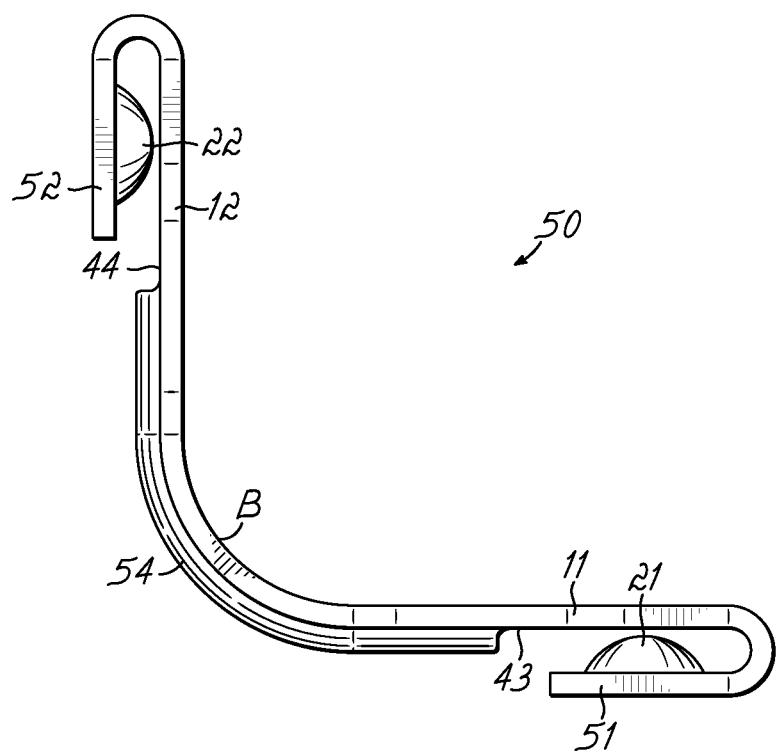
FIG. 10 is a top plan view of a fourth embodiment of a post coupler according to the invention, also referred to as an inside wrap post coupler.
Figure 11:
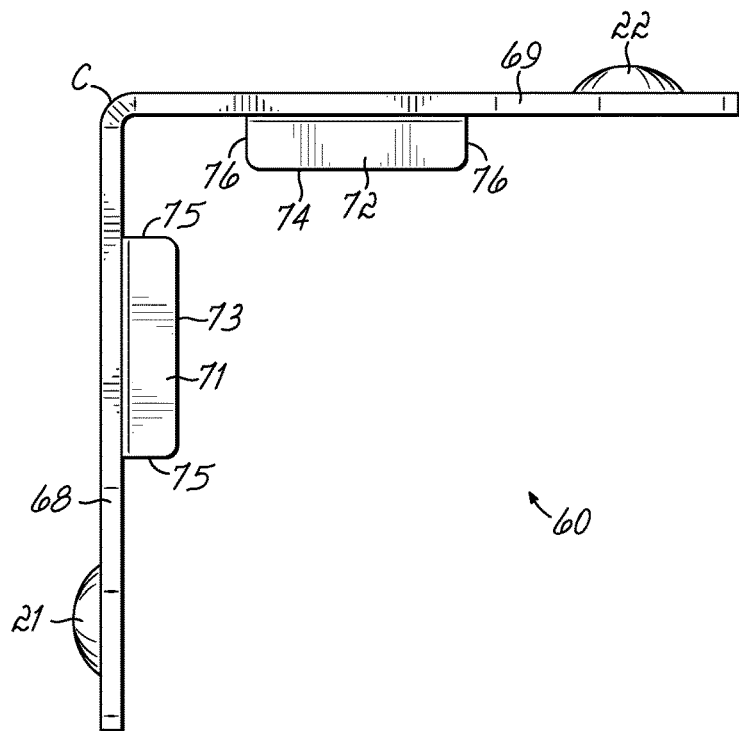
FIG. 11 is a top plan view of a fifth embodiment of a post coupler according to the invention and referred to as an internal post coupler.
Figure 12:
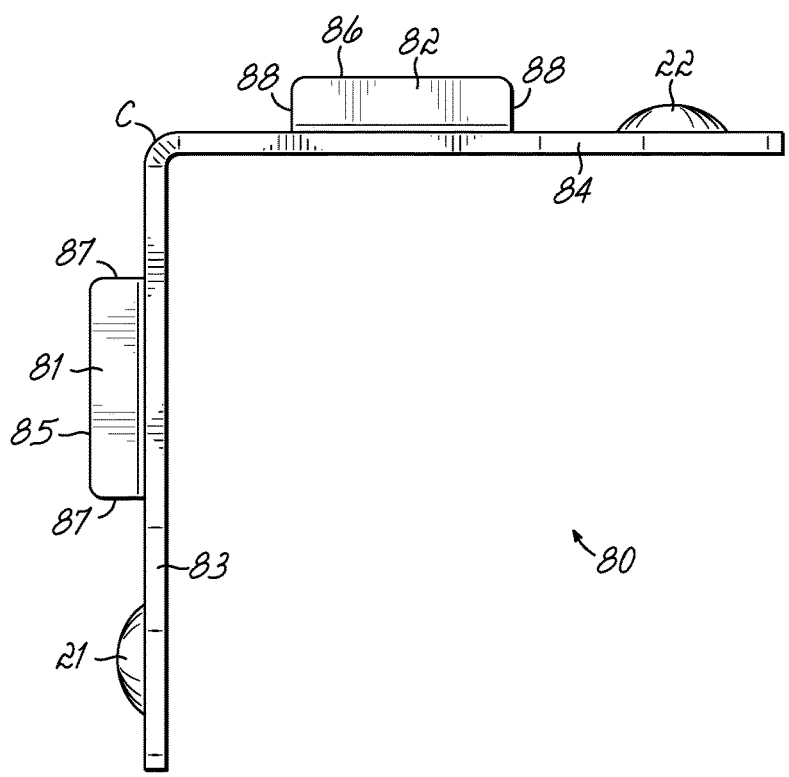
FIG. 12 is a top plan view of a sixth embodiment of a post coupler according to the invention and also referred to as an internal post coupler.
Figure 13:
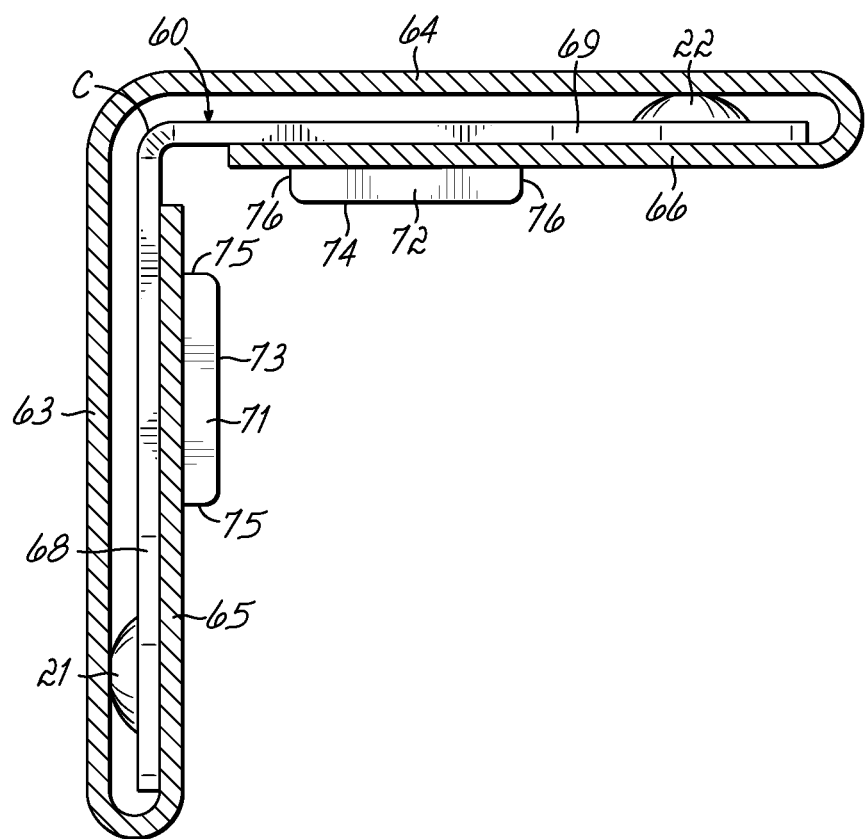
FIG. 13 is a top view in partial cross section of the post coupler of FIG. 11 and illustrating the post coupler in use within gaps of a formed post.

Turning now to the drawings, there are shown several embodiments of the invention. FIGS. 1-3 illustrate a first embodiment; FIGS. 4-6 illustrate a second embodiment; FIGS. 7-9 illustrate a third embodiment; FIG. 10 illustrates a fourth embodiment; FIGS. 11 and 13 illustrate a fifth embodiment and FIG. 12 illustrates a sixth embodiment.

The first embodiment illustrated in FIGS. 1-3 includes a post coupler 10 according to the invention having two intersecting coupler flanges 11, 12, two reverse bend flanges 13, 14, and two post stop elements 15, 16. Coupler flanges 11, 12 define respective inside flange surfaces 17, 18, with reverse bend flanges 13, 14 respectively facing surfaces 17, 18 of coupler flanges 11, 12. Thus surfaces 17, 18 respectively face reverse bend flanges 13, 14.

Coupler 10 is an outside wrap coupler (see FIG. 3) wrapping around posts to be coupled from the outside.

Post stop elements 15, 16 are each respectively formed from coupler flanges 11, 12 and extend therefrom, thus extending from respective surfaces 17, 18. Each stop element comprises a tab with a free end 19, 20, each spaced from respective surface 17, 18 facing respective reverse bend flanges 13, 14. In addition, the tabs of stops 15, 16 have side edges also separated or spaced from the respective post coupler flanges 11, 12.

Reverse bend flanges 13, 14 have dimples 21, 22 extending respectively toward surfaces 17, 18 of respective coupler flanges 11, 12 to facilitate frictional capture of posts inserted into coupler 10.

FIG. 3 illustrates coupler 10 coupling together two posts 25, 26 at proximate ends thereof. As an example, each post 25, 26 is a formed post defined by a respective post flange 27, 28, intersecting at an angle A, such as at 90°. Coupler flanges 11 and 12 also intersect at an angle such as at angle B, also preferably at about 90°.

When used to erect a composite, unitary, post of end-to-end posts 25, 26, coupler 10 receives an end 30 of post 25 and an end 31 of post 26 inserted into coupler 10 in opposed directions, until engaging stop elements 15, 16.

Stop elements 15, 16 block end 30 of post 25 for extending beyond elements 15, 16 toward post 26 and also block end 31 of post 26 from extending beyond elements 15, 16 toward post 25.

In this manner, posts 25, 26 are inserted into coupler 10 to a limited and preferably equal distance, defined by stop elements 15, 16. The posts cannot overlap at post ends 30, 31, and each post is captured by a substantially equal extension of coupler 10. This provides a consistent, rigid, and composite unitary post including posts 25, 26 coupler end-to-end at elements 15, 16, by coupler 10.

It will be appreciated that post flanges 27, 28 are frictionally engaged by respective coupler flanges 17, 18 on one side, and preferably by dimples 21, 22 on the other. While the dimples 21, 22 are optional, they facilitate frictional grip of post flanges 27, 28 but do not positively obstruct insertion of posts 25, 26 into coupler 10.

In this regard it will be appreciated that the reverse bend flanges 13, 14 may flex at their respective junctions with respective coupler flanges 11, 12, facilitating reception of posts 25, 26 into coupler 10 and frictional engagement of posts 25, 26 by coupler 10.

Thus stated in another way, stop elements 15, 16 extend into post receiving paths defined by gaps in coupler 10 between the respective coupler flanges 11, 12 and respective reverse bend flanges 13, 14, and positively block such paths, positively limiting insertion of respective posts 25, 26 into coupler 10, respectively.

Second Embodiment

A second embodiment of the invention comprising post coupler 34 is shown in FIGS. 4-6. For clarity, components of post coupler 34 like those of coupler 10 are identified by the same component numbers. Outer wrap post coupler 34 of this embodiment is very similar to outer wrap coupler 10 of FIGS. 1-3 with the exception of the structure of a unitary post stop element 35.

A unitary, or embossed stop element 35 comprises an integral projection or embossment formed in coupler flanges 11, 12 from the outside of those flanges inwardly, so the embossment extends inwardly as do the elements 15, 16 of coupler 10. Nevertheless, embossed element 35 has no free end or free edges not attached to coupler flanges 11, 12.

Embossment 35 extends around coupler 34, from both coupler flanges 11, 12 and around and through the angular intersection of coupler flanges 11, 12.

FIG. 6 illustrates a unitary post formed by two posts 25, 26 inserted into coupler 34. In this embodiment, embossment 35 blocks the path of insertion of each post 25, 26, so those posts cannot extend further into coupler 34 than allowed by embossment 35.

Coupler 24 with embossment 35 may be formed by stamping, punching or any suitable process.

Third Embodiment

FIGS. 7-9 illustrate a third embodiment of the invention and particularly an inside wrap post coupler 40. Again, the same component numbers as used in FIGS. 1-3 are applied to FIGS. 7-9 where the components of coupler 40 are like those of coupler 10 in structure and function.

Like coupler 10, inside wrap coupler 40 includes two coupler flanges 11, 12, intersecting at an angle B. Post coupler 40 since disposed interiorly of posts 25, 26 (FIG. 9) and wrapping around the post edges from the inside or interior.

To this end, coupler 40 includes two reverse bend flanges 41, 42 respectively extending form longitudinal edges of coupler flanges 11, 12, but to a position where the reverse bend flanges 41, 42 and the coupler flanges 11, 12 face each other via outside flange surfaces 43, 44. Dimples 21, 22 extend from reverse bend flanges 41, 42 toward flanges surfaces 43, 44. Reverse bend flanges 41, 42 define a gap between them and coupler flanges 11, 12, respectively.

Coupler 40 also includes stop elements 46, 47, each respectively formed from coupler flanges 11, 12 and extending therefrom and particularly extending outwardly from surfaces 43, 44. Each stop element 46, 47 comprises a tab having a free end 48, 49, each spaced from a respective surface 43, 44. In addition, also separated or spaced from the respective post coupler flanges 11, 12.

FIG. 9 illustrates coupler 40 coupling together two posts 25, 26 at proximate ends thereof. As an example, each post 25, 26 is a formed post defined by a respective post flange 27, 28 intersecting at an angle A, such as at 90°. Angle B in coupler 40 is also preferably at about 90°.

When used to erect a composite, unitary post of end-to-end posts 25, 26, coupler 40 receives an end 30 of post 26 and an end 31 of post 25, each such post ends being inserted into coupler 40 in opposite directions, until engaging stop elements 46, 47. Like the reverse bend flanges 13, 14 of coupler 10, the reverse bend flanges 41, 42 of coupler 40 wrap around respective edges of posts 25, 26, but from the inside or interior of posts 25, 26 around to the outside of posts 25, 26 as seen in FIG. 9.

Stop elements 46, 47 block end 30 of post 25 from extending beyond step elements 46, 47 towards post 26, and also block end 31 of post 26 from extending beyond stop elements 46, 47 toward post 25.

In this manner, posts 25, 26 are inserted into coupler 40 a limited preferably equidistance, defined by stop elements 46, 47.

The posts 25, 26 cannot overlap at respective post ends 30, 31 and each post 25, 26 is captured by a substantially equal extension of coupler 40. This provides a consistent, rigid, composite and unitary post including posts 25, 26 coupled end-to-end at stop elements 46, 47 by coupler 40.

As in coupler 10, post flanges 27, 28 are to be captured between the post coupler flanges 11, 12 on one side and preferably by dimples 21, 22 as the other, although reversed from the engagement of these parts as in FIG. 3, to the configuration as in FIG. 9.

And as in coupler 10, the reverse bend flanges 41, 42 of coupler 40 may flex at their respective junctures with respective coupler flanges 11, 12 facilitating reception of posts 25, 26 into coupler 40 and frictional engagement of posts 25, 26 by coupler 40.

Thus stop elements 46, 47 extend into paths defined by gaps in coupler 40 between coupler flanges 11, 12 and respective reverse bend flanges 41, 42 and positively block such paths, positively limiting insertion of respective posts 25, 26 into coupler 40.

A fourth embodiment of the invention is illustrated in FIG. 10 and bears a relationship to FIGS. 4-6 as that of FIGS. 7-9 to FIGS. 1-3.

Accordingly, FIG. 10 illustrates an inside wrap post coupler 50 having post coupler flanges 11, 12 and reverse bend flanges 51, 52 extending from respective edges of flanges 11, 12 (as in FIG. 7, for example).

In FIG. 10, like components to those of FIGS. 1-9 in structure and function bear the same component numbers.

Coupler 50, however comprises an integral projection, embossment or stop element 54 formed in coupler flanges 11, 12 and around angle B where flanges 11, 12 intersect. Nevertheless, and differently than element 35 of FIGS. 4-6, stop embossment 54 is formed to protrude outwardly from flanges 11, 12 and intersecting angle B rather than inwardly as stop 35 in FIGS. 4-6.

Embossed stop element 54 has no free end or free edges not attached to coupler flanges 11, 12.

Embossed stop 54 prevents extension of ends of posts (not shown) into coupler 50 beyond the element 50 is non-overlapping relation.

It will be appreciated that coupler 50 can be used to couple post sections end-to-end, abutting stop 54, to form a composite but unitary post.

Fifth Embodiment

A fifth embodiment of the invention is illustrated in FIGS. 11-13 and comprises a hidden coupler 60. Coupler 60 is particularly useful for joining formed post sections having an enveloping configuration such as illustrated in cross-section in FIG. 13.

In FIG. 13 and for example, typical post section has two post flanges 63, 64, a reverse bend post flange 65 extending alongside, but spaced from post flange 63 and a reverse bend post flange 66 extending alongside but spaced from post flange 64.

In use, coupler 60 is disposed within respective gaps, one formed between post flange 63 and reverse bend post flange 65 and the other between post flange 64 and reverse bend post flange 66, as will be described.

Coupler 60 comprises coupler flanges 68, 69, intersecting at angle C, preferably about 90°.

In one configuration, coupler 60 includes two post stop elements or tabs 71, 72 extending inwardly from respective coupler flanges 68, 69 and each having free ends 73, 74 and free side edges 75, 76 as shown. These tabs are formed from flanges 68, 69 by punching, stamping cutting or any other suitable process.

Dimples 21, 22 are also formed in coupler flanges 68, 69.

In use, post section such as that in FIG. 13 receives one end of coupler 60, and another similar post section receives another end of coupler 60, which extends into each post section a preferably similar distance. The insertion of coupler 60 into each post section is limited by stop tabs 71, 72 as will be appreciated.

Thereby a composite, unitary post is formed and defined by two separate formed post sections and hidden coupler 60, which is essentially hidden within the post sections. The post sections are thus aligned end-to-end and do not overlap.

Dimples 21, 22 may frictionally engage post flanges 63, 64 to facilitate interconnection between coupler 60 and the post section.

A variation of the fifth embodiment is illustrated in FIG. 12 wherein a hidden coupler 80 is similar to hidden coupler 60 excepting for stop elements or tabs 81, 82 which extend from hidden coupler flanges 83, 84 respectively in an outward direction (as opposed to the inward extension of tabs 71, 72 of coupler 60 in FIG. 11.

Tabs 81, 82 each have a free end 85, 86 respectively, and free side edges 87, 88 spaced from a respective coupler flange 83, 84.

Hidden coupler 80 functions as does hidden coupler 60, excepting the direction of the oppositely extending stop tabs 81, 82 in coupler 80.

Many variations of the embodiments described herein will be readily appreciated, all providing in a post coupler a positive stop for limiting the extension of a post section into or over the coupler and preventing post overlap in or over the coupler.

Assembly Methods

Methods of assembly of both shelving units and of composite posts therein are illustrated in and from this disclosure and the drawings herein.

These methods include inserting respective ends of respective post segments into the post couplers as described and into engagement with one or more positive post segment stops in the coupler to form a composite post of multiple post segments and post coupler. The positive post stops are formed from post coupler flanges extending from the sides of coupler flanges facing reverse bend flanges thereof. With respect to a post coupler having only post coupler flanges with no reverse bend flanges, the coupler is inserted into gaps in respective ends of post segments formed by post flanges and respective reverse bend flanges thereof.

Once the composite posts are so formed, horizontal shelf support beams are interconnected to the composite posts and shelves are assembled thereto to form a shelving unit.

These and other benefits, advantages and alternatives will become readily apparent from the foregoing descriptions and drawings without departing from the scope of the invention and applicant intends to be bound only by the claims appended hereto.

What is claimed is:

1. A post coupler for coupling separate post components together to form a post longer than the length of a post component, said post components comprising post flanges formed at an angle with respect to each other,
    said coupler comprising:
    post coupler flanges disposed at an angle with respect to each other;
    reverse bend flanges extending from, along, parallel to and facing respective post coupler flanges; and
    post stop elements extending outwardly from said post coupler flanges and on the same sides thereof facing respective reverse bend flanges, the post stop elements preventing insertion of a post component beyond post stop elements.

2. The post coupler as in claim 1 wherein said reverse bend flanges extend along inside surfaces of said post coupler flanges.

3. The post coupler as in claim 1 wherein said post stop elements comprise tabs extending from said post coupler flanges, said tabs having free ends and side edges separated from said post coupler flanges.

4. The post coupler as in claim 1 wherein said post stop elements comprise a single integral projection formed in and extending laterally along and from said post coupler flanges.

5. The post coupler as in claim 4 wherein said post coupler flanges intersect at said angle and wherein said post stop element extends from each post coupler flange around the intersection of said post coupler flange.

6. The post coupler as in claim 1 wherein said reverse bend flanges extend along outside surfaces of said post coupler flanges.

7. The post coupler as in claim 6 wherein said post stop elements comprise tabs extending from said post coupler flanges, said tabs having ends and side edges separated from said post coupler flanges.

8. The post coupler as in claim 6 wherein said post stop elements comprise integral projections formed in and extending laterally along and from said post coupler flanges.

9. A shelving unit, comprising:
    a first post having a first post end;
    a second post having a second post end;
    a post coupler having first and second post coupler ends, comprising:
        post coupler flanges disposed at an angle with respect to each other;
        reverse bend flanges extending from, along, parallel to and facing respective post coupler flanges; and
        post stop elements extending outwardly from the post coupler flanges and on the same sides thereof facing respective reverse bend flanges,
    wherein the first post end being inserted into the first post coupler end and contacting the post stop elements and the second post end being inserted into the second post coupler end and contacting the post stop elements.

10. A shelving unit, comprising:
    first and second posts, the first post having a first post end, the second post having a second post end, each post comprising:
        post flanges disposed at an angle with respect to each other; and
        reverse bend post flanges extending from, along, parallel to, and facing respective post flanges to form a gap between the post flanges and the reverse bend post flanges; and
    a hidden post coupler having first and second hidden post coupler ends, the hidden post coupler comprising:
        hidden post coupler flanges disposed at an angle with respect to each other; and
        a post stop extending in a direction away from the respective hidden post coupler flanges,
    wherein the first post end being inserted into the first hidden post coupler end and contacting the post stop and the second post end being inserted into the second post coupler end and contacting the post stop.

11. The shelving unit as in claim 10 wherein each said post stop comprises a tab having a free end spaced from a respective hidden post coupler flange.

12. The shelving unit as in claim 11 wherein each said tab comprises free edges spaced from a respective hidden post coupler flange.

13. The shelving unit as in claim 10, wherein each post flange having a first length and each reverse bend post flange having a second length which is nearly as long as the first length such that hidden post couple is essentially hidden within the first and second posts.

* * * * *